United States Patent
Nakai et al.

(10) Patent No.: US 12,117,358 B2
(45) Date of Patent: Oct. 15, 2024

(54) ELECTRIC CYLINDER SYSTEM

(71) Applicant: SINTOKOGIO, LTD., Nagoya (JP)

(72) Inventors: Takuma Nakai, Shinshiro (JP); Yuu Ishida, Shinshiro (JP)

(73) Assignee: SINTOKOGIO, LTD., Nagoya (JP)

( * ) Notice: Subject to any disclaimer, the term of this patent is extended or adjusted under 35 U.S.C. 154(b) by 263 days.

(21) Appl. No.: 17/763,699

(22) PCT Filed: Aug. 27, 2020

(86) PCT No.: PCT/JP2020/032410
§ 371 (c)(1),
(2) Date: Mar. 25, 2022

(87) PCT Pub. No.: WO2021/065264
PCT Pub. Date: May 8, 2021

(65) Prior Publication Data
US 2022/0349763 A1    Nov. 3, 2022

(30) Foreign Application Priority Data

Sep. 30, 2019   (JP) ................................. 2019-178572

(51) Int. Cl.
*G01L 5/00* (2006.01)
*B30B 15/28* (2006.01)

(52) U.S. Cl.
CPC .......... *G01L 5/0066* (2013.01); *B30B 15/281* (2013.01); *G01L 5/0076* (2013.01)

(58) Field of Classification Search
CPC .......... B30B 1/18; B30B 1/181; B30B 1/186; B30B 15/14; B30B 15/148; B30B 15/26;
(Continued)

(56) References Cited

U.S. PATENT DOCUMENTS

| 4,667,496 A | 5/1987 | Asai et al. |
| 6,535,825 B1 | 3/2003 | Okano |

(Continued)

FOREIGN PATENT DOCUMENTS

| CN | 102049880 A | 5/2011 |
| CN | 102574351 A | 7/2012 |

(Continued)

OTHER PUBLICATIONS

International Preliminary Report on Patentability mailed Apr. 14, 2022 in International Application No. PCT/JP2020/032410.

*Primary Examiner* — Christopher L Templeton
*Assistant Examiner* — P Derek Pressley
(74) *Attorney, Agent, or Firm* — Faegre Drinker Biddle & Reath LLP

(57) ABSTRACT

An electric cylinder system includes: an electric cylinder including a rod and a strain detector; an output unit configured to output, on the basis of a reference load value in accordance with an output value of a strain detector for calibration obtained when the rod presses the strain detector for calibration and a measurement load value in accordance with an output value of the strain detector obtained when the rod presses the strain detector for calibration, a gain and an offset for causing the measurement load value to approach the reference load value; a storage unit configured to store the gain and the offset as a calibration parameter; and a calibration unit configured to calibrate a load value in accordance with an output value detected by the strain detector on the basis of the calibration parameter wherein the gain and the offset satisfy a preset relationship.

1 Claim, 5 Drawing Sheets

(58) Field of Classification Search
CPC ..... B30B 15/28; B30B 15/281; G01L 5/0066; G01L 5/0076
See application file for complete search history.

(56) References Cited

U.S. PATENT DOCUMENTS

| | | |
|---|---|---|
| 2012/0249042 A1 | 10/2012 | Shirai et al. |
| 2013/0088182 A1 | 4/2013 | Nagasaka et al. |
| 2017/0259516 A1 | 9/2017 | Noguchi et al. |
| 2020/0094506 A1 | 3/2020 | Noguchi et al. |

FOREIGN PATENT DOCUMENTS

| | | | | |
|---|---|---|---|---|
| JP | S59-212200 A | | 12/1984 | |
| JP | S60-115399 A | | 6/1985 | |
| JP | 2004148345 A | * | 5/2004 | |
| JP | 2010-145290 A | | 7/2010 | |
| JP | 2017-159324 A | | 9/2017 | |
| JP | 2017-177203 A | | 10/2017 | |
| JP | 2018094567 A | * | 6/2018 | ............... B30B 1/00 |
| JP | 2019-072752 A | | 5/2019 | |
| TW | 553063 U | | 9/2003 | |

\* cited by examiner

ELECTRIC CYLINDER SYSTEM

TECHNICAL FIELD

The present disclosure relates to an electric cylinder system.

BACKGROUND ART

Patent Document 1 discloses an electric press that presses a workpiece by operating a ram. The electric press includes a load cell that detects a load applied to the ram, and a control unit that calibrates the load cell. The control unit adjusts the gain value and the offset value of an amplifier of the load cell. Specifically, the control unit repeatedly performs fine adjustment of the gain value and fine adjustment of the offset value of the amplifier until it is determined that the output value of the amplifier obtained when 30% of the load rating is applied and the output value of the amplifier obtained when 60% of the load rating is applied fall within defined ranges. The defined ranges are determined with use of a load value acquired in an initial stage or a detection value of a load cell for calibration.

CITATION LIST

Patent Document

Patent Document 1: Japanese Unexamined Patent Publication No. 2017-159324

SUMMARY OF INVENTION

Technical Problem

The electric press described in Patent Document 1 needs to perform fine adjustment of the gain value and the offset value of the amplifier of the load cell while confirming the results, and hence there is a fear that it takes time to perform the calibration. The present disclosure provides an electric cylinder system capable of easily calibrating an output of a strain detector that detects a load of an electric cylinder.

Solution to Problem

An electric cylinder system according to one aspect of the present disclosure includes: an electric cylinder including a rod pressing a workpiece, and a strain detector outputting a value in accordance with a load applied to the rod; an output unit outputting, on the basis of a reference load value in accordance with an output value of a strain detector for calibration obtained when the rod presses the strain detector for calibration and a measurement load value in accordance with an output value of the strain detector obtained when the rod presses the strain detector for calibration, a gain value and an offset value for causing the measurement load value to approach the reference load value; a storage unit storing the gain value and the offset value output by the output unit as a calibration parameter; and a calibration unit calibrating a load value in accordance with an output value detected by the strain detector on the basis of the calibration parameter stored in the storage unit, wherein the gain value and the offset value output by the output unit satisfy a relationship of Expression (1):

$$a = \frac{s_{xy}}{s_x^2}, \quad b = Y - a \times X \quad (1)$$

where a represents the gain value, b represents the offset value, $s_x$ represents a variance value of the measurement load value, $s_{xy}$ represents a covariance value of the measurement load value and the reference load value, X represents an average value of the measurement load value, and Y represents an average value of the reference load value.

According to the electric cylinder system, the load value in accordance with the output value of the strain detector is calibrated on the basis of the gain value a and the offset value b output by the output unit. The gain value a and the offset value b output by the output unit satisfy the relationship expressed by Expression (1), and hence the calibration unit can consider that the correspondence relationship between the reference load value and the measurement load value is a relationship approximated to a straight line by the least-squares method and calibrate the difference between the reference load value and the measurement load value. Therefore, according to the electric cylinder system, the correspondence relationship between the reference load value and the measurement load value can be derived by measuring the measurement load value corresponding to the reference load value several times, and hence the output of the strain detector that detects the load of the electric cylinder can be calibrated in an easier manner as compared to a case where fine adjustment of the gain value and the offset value of an amplifier of a load cell is performed while the result is confirmed.

In one embodiment, the electric cylinder system may further include a determination unit determining whether a difference between the reference load value and the measurement load value after calibration by the calibration unit is equal to or less than a threshold value. In this case, the electric cylinder system can determine whether the calibration has been adequately performed by the determination unit, and hence can reduce operation time as compared to a case where a worker performs the determination.

In one embodiment, the output unit may output, when it is determined that the difference is not equal to or less than the threshold value by the determination unit, a correction value for correcting a load value corresponding to the measurement load value for which it is determined that the difference is not equal to or less than the threshold value, the storage unit may store the correction value output by the output unit, the calibration unit may correct a load value in accordance with an output value detected by the strain detector on the basis of the correction value stored in the storage unit, and the correction value output by the output unit may satisfy a relationship of Expression (2):

$$C_d = y_d - x_d = (y_2 - y_1) \times \frac{(x_d - x_1)}{(x_2 - x_1)} + y_1 - x_d \quad (2)$$

where $C_d$ represents the correction value, $x_d$ represents a load value that is a subject of correction, $y_d$ is a reference load value corresponding to the load value $x_d$, $x_1$ and $x_2$ are measurement load values of two neighboring points of the load value $x_d$, and $y_1$ and $y_2$ are reference load values corresponding to the measurement load values $x_1$ and $x_2$.

In this case, for a load value for which it is difficult to approximate the correspondence relationship between the reference load value and the measurement load value by the least-squares method, the electric cylinder system can calculate the correction amount with use of the measurement load value and the reference load value of two neighboring points of the load value. Therefore, the electric cylinder system can calibrate the output of the strain detector that detects the load of the electric cylinder in a more accurate manner.

Advantageous Effects of Invention

The electric cylinder system according to the present disclosure is capable of easily calibrating the output of the strain detector that detects the load of the electric cylinder.

DESCRIPTION OF EMBODIMENTS

Figure 1:
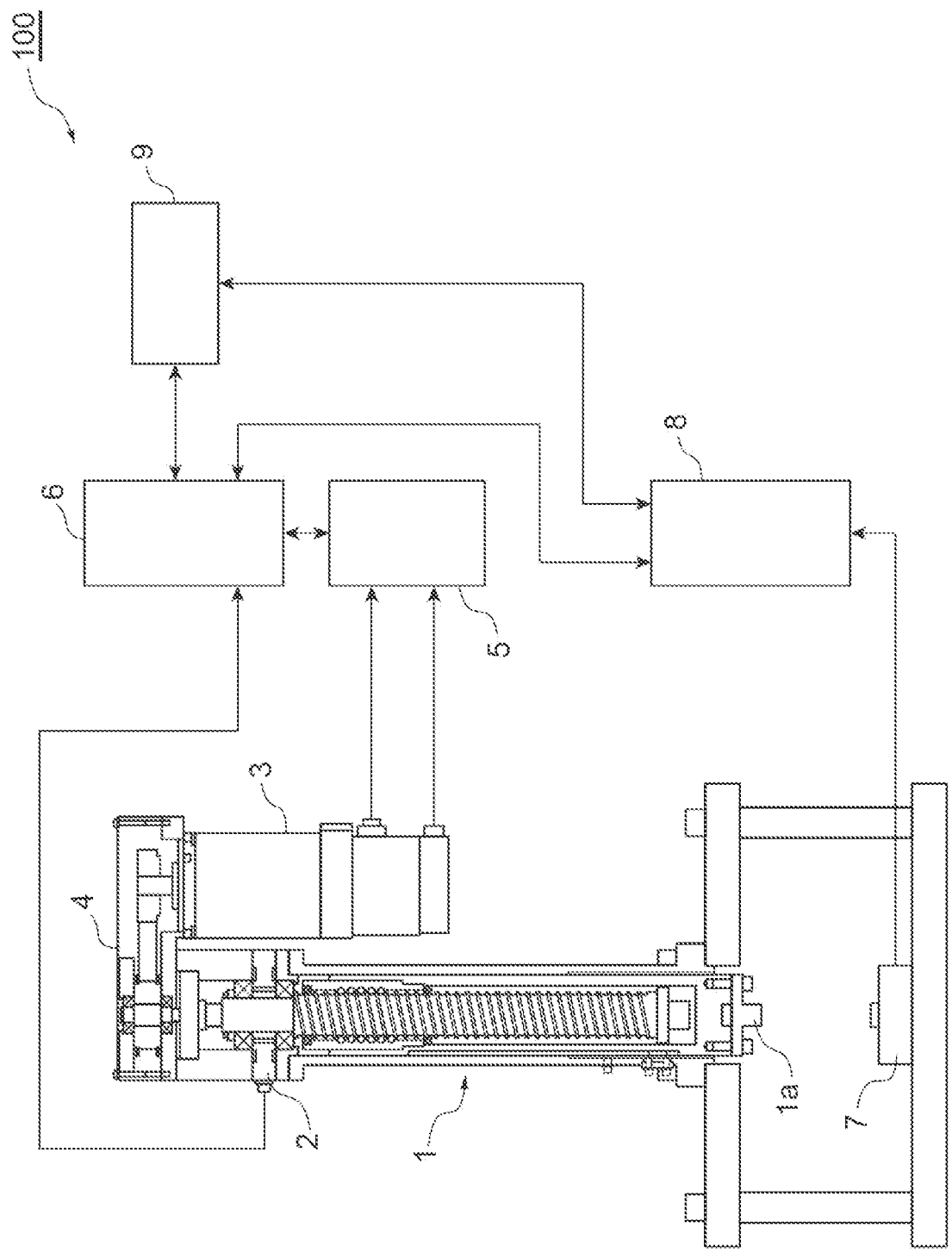
FIG. 1 is a schematic view illustrating one example of an electric cylinder system according to an embodiment.

An embodiment of the present disclosure is described below with reference to the drawings. In the description below, the same or equivalent elements are denoted by the same reference characters, and overlapping description is not repeated. Dimension ratios of the drawings do not necessarily match with those described. Terms "up", "down", "left", and "right" are based on the illustrated states and are for convenience.

[Configuration of Electric Cylinder System]

FIG. 1 is a schematic view illustrating one example of an electric cylinder system according to an embodiment. An electric cylinder system 100 illustrated in FIG. 1 presses a workpiece (not shown) and performs molding, press fitting, or the like. As illustrated in FIG. 1, the electric cylinder system 100 includes an electric cylinder 1. The electric cylinder 1 is fixed to a frame. The electric cylinder 1 has a rod 1a that presses the workpiece. The workpiece is placed on a workpiece table of the frame and is pressed between the workpiece table and a distal end of the rod 1a of the electric cylinder 1 when the rod 1a extends.

The electric cylinder 1 has a strain detector 2 that outputs a value in accordance with a load applied to the rod 1a. The strain detector 2 is a load cell as one example. The strain detector 2 outputs a voltage value (one example of an output value) in accordance with the load applied to the rod 1a, for example. The strain detector 2 is not limited to a configuration of outputting a voltage value and may output a value converted to a current value and the like.

The electric cylinder 1 causes the rod 1a to extend and contract in the vertical direction by transmitting a rotational driving force of a motor 3 to the rod 1a side via a rotation transmission mechanism 4 and converting the rotational driving force to a linear driving force. The motor 3 is configured to be able to communicate with a motor driver 5 and operates on the basis of a signal from the motor driver 5. The motor driver 5 is a servo amplifier as one example. A signal in accordance with the shaft rotation angle of the motor 3 is input to the motor driver 5 via an encoder. The motor driver 5 applies a current to a motor body on the basis of the signal input from the encoder and controls the operation of the motor 3.

The motor driver 5 is connected to a servo controller 6. The servo controller 6 is a programmable logic controller, for example. The servo controller 6 may be configured by a general-purpose computer including an arithmetic unit such as a central processing unit (CPU), a storage apparatus such as a read only memory (ROM), a random access memory (RAM), and a hard disk drive (HDD), a communication apparatus, and the like, for example. The strain detector 2 is connected to the servo controller 6, and a voltage value or a current value output by the strain detector 2 is input to the servo controller 6. The servo controller 6 performs amplification and A/D conversion of the input voltage value or current value and converts the voltage value or the current value to a load value.

Figure 2:
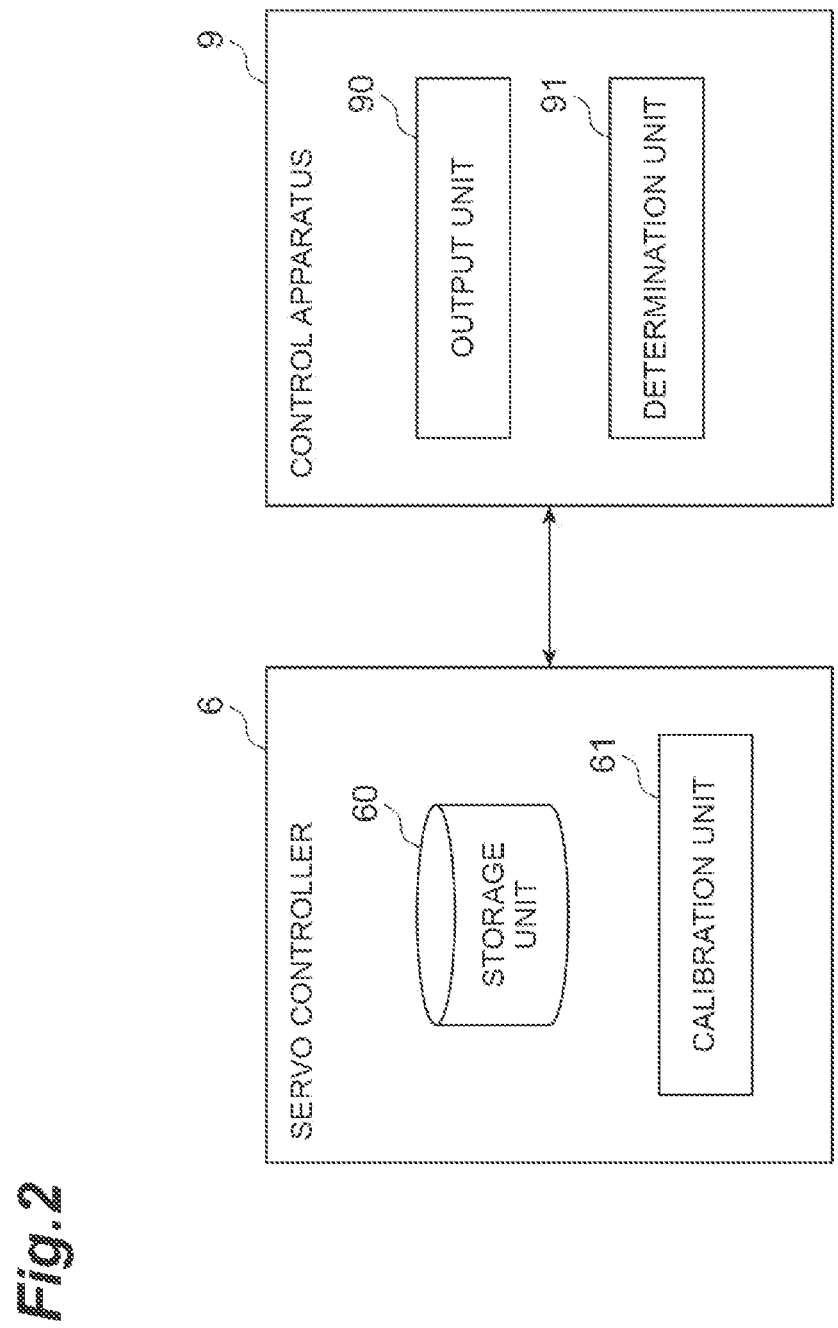
FIG. 2 is a block diagram illustrating one example of functions of the electric cylinder system.

In the strain detector 2, there is a fear that the output obtained when a load is not applied fluctuates and the output obtained when a load is applied is shifted from the actual load value due to aged deterioration and the like. Therefore, the servo controller 6 calibrates the load value in accordance with the voltage value detected by the strain detector 2 and causes the motor driver 5 to be operated by the calibrated load value. FIG. 2 is a block diagram illustrating one example of functions of the electric cylinder system. As illustrated in FIG. 2, the servo controller 6 includes a storage unit 60 and a calibration unit 61. The storage unit 60 stores calibration parameters therein. Examples of the calibration parameters include a gain value and an offset value. The calibration unit 61 refers to the storage unit 60 and subtracts an offset value from the load value in accordance with the voltage value detected by the strain detector 2. The calibration unit 61 causes the load value from which the offset value has been subtracted to be a calibrated load value by dividing the load value by again value. The calibration unit 61 may add and subtract offset values to and from the voltage value detected by the strain detector 2, multiply the voltage value by a gain value, and then convert the voltage value to a load value.

Returning to FIG. 1, the servo controller 6 determines an instruction to the motor driver 5 on the basis of the calibrated load value. For example, when a target load value is 3 kN, the servo controller 6 causes the motor driver 5 to operate until the calibrated load value is 3 kN.

In order to determine the abovementioned calibration parameters, the electric cylinder system 100 includes a strain detector 7 for calibration, an amplifier 8, and a control apparatus 9. The strain detector 7 for calibration, the amplifier 8, and the control apparatus 9 may be included in the electric cylinder system 100 at the time of operation of calibration and may be removed when the operation of calibration ends. The strain detector 7 for calibration outputs a voltage value in accordance with the load by being directly pressed by the rod 1a. The strain detector 7 for calibration is connected to the amplifier 8, and outputs the voltage value to the amplifier 8. The amplifier 8 amplifies a signal of the voltage value output by the strain detector 7 for calibration. The amplifier 8 converts the voltage value or the current value output by the strain detector 7 for calibration to a load value. The amplifier 8 is connected to the servo controller 6 and the control apparatus 9, and outputs the amplified signal of the voltage value to the servo controller 6 and the control apparatus 9.

The control apparatus 9 is configured by a general-purpose computer including an arithmetic unit such as a CPU, a storage apparatus such as a ROM, a RAM, and an HDD, a communication apparatus, and the like, for example. The control apparatus 9 is connected to the servo controller 6 and the amplifier 8. The control apparatus 9 acquires the load value detected by the strain detector 2 from the servo controller 6, and the amplifier 8 converts the voltage value detected by the strain detector 7 for calibration to a load value. The control apparatus 9 may acquire a load value corresponding to the voltage value detected by the strain detector 7 for calibration from the servo controller 6. In this case, the servo controller 6 acquires the voltage value detected by the strain detector 7 for calibration from the amplifier 8 and converts the voltage value to a load value. In the following, a load value corresponding to the voltage value detected by the strain detector 2 during the calibration operation is also referred to as a measurement load value, and a load value corresponding to the voltage value detected by the strain detector 7 for calibration during the calibration operation is also referred to as a reference load value.

The control apparatus 9 includes an output unit 90. The output unit 90 determines the gain value and the offset value (the abovementioned calibration parameters) for causing the measurement load value to approach the reference load value on the basis of the reference load value and the measurement load value. Specifically, the output unit 90 determines the gain value and the offset value by approximating the correspondence relationship between the reference load value and the measurement load value by the least-squares method. The output unit 90 outputs the determined calibration parameters to the servo controller 6. The servo controller 6 stores the acquired calibration parameters in the storage unit 60. The servo controller 6 causes the electric cylinder to operate with use of the calibration parameters determined by the control apparatus 9.

The servo controller 6 causes the electric cylinder to operate, presses the strain detector for calibration again, and calibrates the measurement load value with use of the calibration parameters determined by the control apparatus 9. The control apparatus 9 acquires the measurement load value after calibration. The control apparatus 9 includes a determination unit 91 for determining whether the calibration has been accurately performed. The determination unit 91 determines whether a difference between the reference load value and the measurement load value after calibration is equal to or less than a threshold value. The threshold value is a threshold value for determining whether the calibration has been accurately performed, and is preset. The threshold value is set as a value obtained by adding or subtracting a predetermined load value to or from the reference load value, for example.

When it is determined by the determination unit 91 that the difference between the reference load value and the measurement load value after calibration is not equal to or less than the threshold value, the output unit 90 of the control apparatus 9 outputs a correction value for correcting the measurement load value after calibration for which it is determined that the difference is not equal to or less than the threshold value. For example, provided that load values that are instrumentation targets are 3 kN, 6 kN, 12 kN, 18 kN, and 23 kN. Further, provided that it is determined that the difference between the reference load value and the measurement load value after calibration is not equal to or less than a threshold value when the load values that are the instrumentation targets are 18 kN and 23 kN. In this case, the output unit 90 outputs correction values for correcting the measurement load values after calibration corresponding to the load values of 18 kN and 23 kN that are the instrumentation targets. By performing linear interpolation with use of two measurement points in the vicinity of the measurement load value of 18 kN after calibration in a coordinate space in which the abscissa is the measurement load value after calibration and the ordinate is the reference load value, the output unit 90 calculates a reference load value corresponding to the measurement load value after calibration, and determines a correction amount of the measurement load value after calibration in such a way as to obtain the calculated reference load value. The correction amount is also determined by the same method for the measurement load value of 23 kN. By the above-stated, the accuracy of the calibration can be improved by individually calculating correction amounts for load values for which the relationship between the reference load value and the measurement load value cannot be sufficiently approximated by the least-squares method.

[Calibration Operation of Electric Cylinder System]

Figure 3:
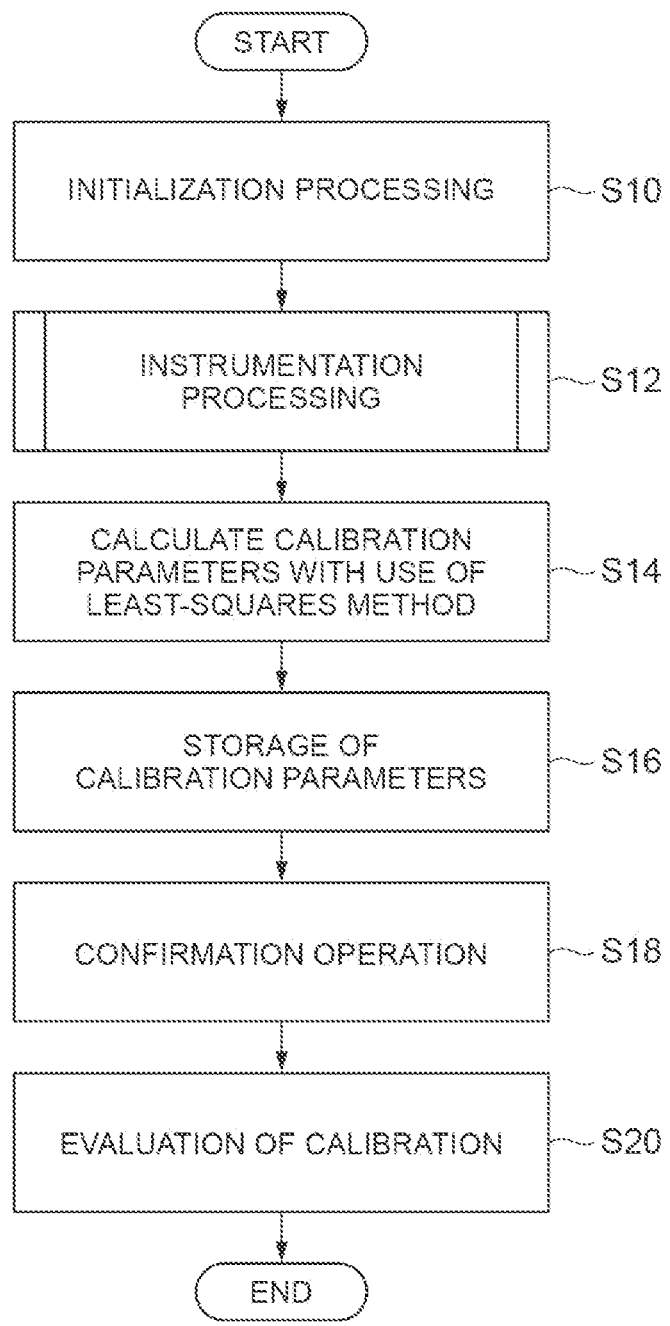
FIG. 3 is a flowchart illustrating one example of a calibration operation of the electric cylinder system.

FIG. 3 is a flowchart describing a calibration operation of the electric cylinder system. The flowchart illustrated in FIG. 3 is executed by the servo controller 6 and the control apparatus 9.

Figure 4:
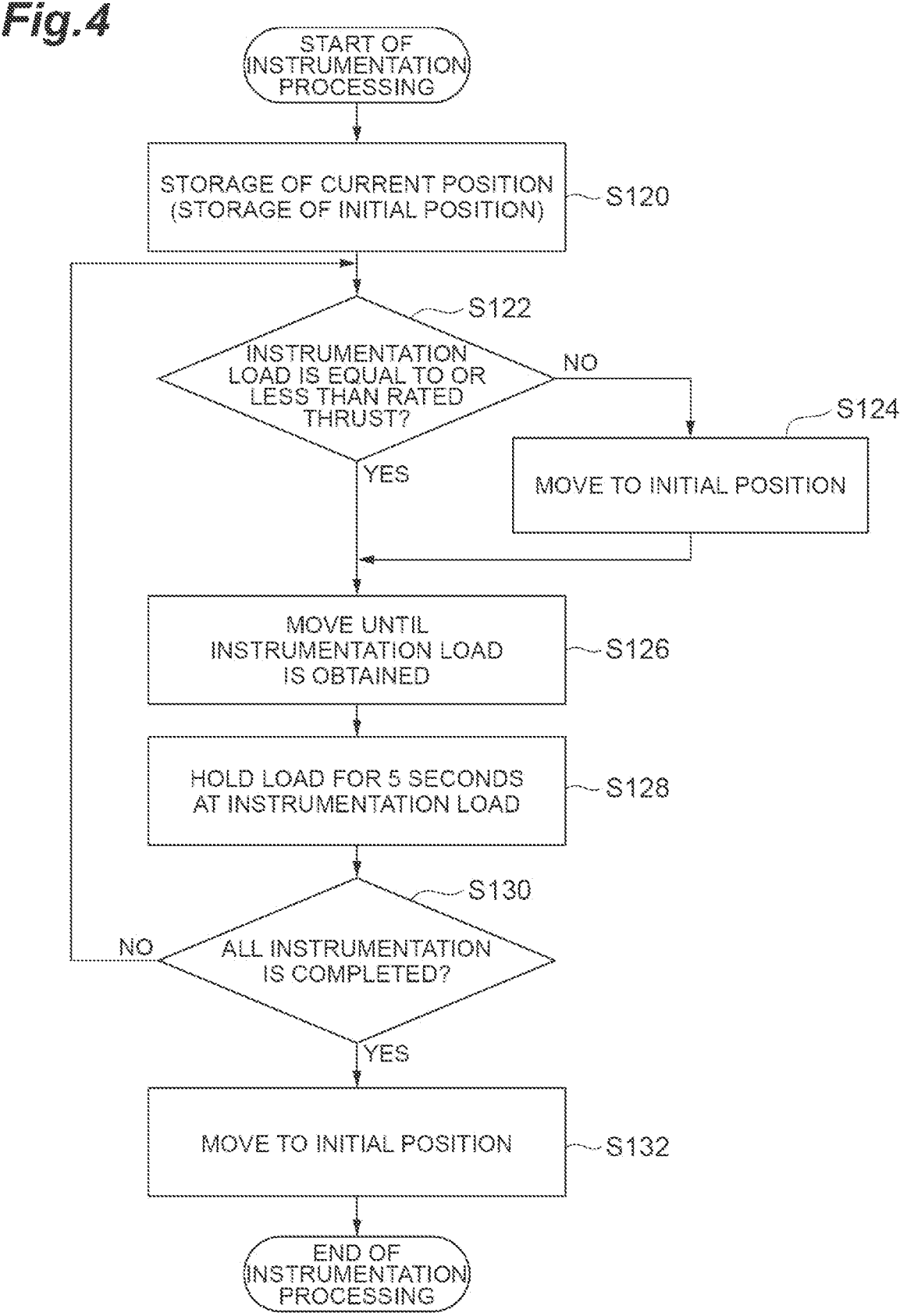
FIG. 4 is a flowchart illustrating one example of instrumentation processing.

As illustrated in FIG. 3, at first, the servo controller 6 resets the calibration parameters stored in the storage unit 60, as initialization processing (Step S10). Next, the servo controller 6 simultaneously performs instrumentation of the measurement load value and the reference load value at a plurality of instrumentation points, as instrumentation processing (Step S12). Details of the instrumentation processing (Step S12) are illustrated in FIG. 4. FIG. 4 is a flowchart illustrating one example of the instrumentation processing. As illustrated in FIG. 4, the servo controller 6 stores the current position (initial position) of the rod 1a therein (Step S120).

Next, the servo controller 6 determines whether the instrumentation load is equal to or less than a rated thrust, as determination processing (Step S122). The instrumentation load is a load that is an instrumentation target, and the rated thrust is a force by which pressing can be performed from a stationary state. When the instrumentation load is equal to or less than the rated thrust (Step S122: YES), the instrumentation load can be applied from the current position of the rod 1a. Meanwhile, when the instrumentation load is not equal to or less than the rated thrust (Step S122: NO), the instrumentation load cannot be applied from the current position of the rod 1a. Therefore, when the instrumentation load is not equal to or less than the rated thrust (Step S122: NO), the servo controller 6 causes the rod 1a to move to the initial position, as moving processing (Step S124).

When the instrumentation load is equal to or less than the rated thrust (Step S122: YES) and the moving processing (S124) has been completed, the servo controller 6 causes the rod to move until the instrumentation load is obtained, as pressing processing (Step S126). The servo controller 6 holds a load for 5 seconds at the instrumentation load, as a holding processing (Step S128). At this time, the servo controller 6 measures a reference load value via the strain detector 7 for calibration while measuring a measurement load value via the strain detector 2.

Next, the servo controller 6 determines whether all instrumentation has been completed, as end confirmation processing (Step S130). For example, a plurality of instrumentation loads are preset before the execution of the flowchart illustrated in FIG. 4. The servo controller 6 determines whether the processing from S122 to S128 has been performed on all of the set instrumentation loads. The servo controller 6 repeatedly executes Step S122 to Step S128 until the processing in S122 to S128 has been performed on all of the instrumentation loads.

When it is determined that the processing from S122 to S128 is performed on all of the instrumentation loads in the end confirmation processing (Step S130), the servo controller 6 causes the rod 1a to move to the initial position, as moving processing (Step S132). When the moving processing (Step S132) ends, the instrumentation processing illustrated in FIG. 4 ends.

Returning to FIG. 3, when the instrumentation processing (Step S12) ends, the control apparatus 9 calculates calibration parameters with use of the least-squares method, as calculation processing (Step S14). The control apparatus 9 performs calculation where the load value (measurement load value) of the rod 1a is $x_i$ and the load value (reference load value) of the strain detector 7 for calibration is $y_i$ at an instrumentation point i. At first, the control apparatus 9 calculates an error $(y_i-x_i)$ at each instrumentation point. Data (an outlier) of which error is large is excluded from the calculation of the least-squares method. The reason is because variance becomes large by the data of which error is large, and the reliability of the approximate line decreases. The control apparatus 9 causes data satisfying Expression (3) to be the subject of calculation.

$$y_i - x_i \leq F_{max} \times th \quad (3)$$

Where, $F_{max}$ represents a maximum thrust, and th represents a threshold value. The threshold value th is a preset value.

Next, the control apparatus 9 calculates an average of the measurement load value $x_i$, an average of the reference load value $y_i$, the variance of the measurement load value $x_i$, and the covariance of the measurement load value $x_i$ and the reference load value $y_i$. The above is described in order as Expressions (4) to (7).

$$X = \frac{1}{n}\sum_{i=1}^{n} x_i \quad (4)$$

$$Y = \frac{1}{n}\sum_{i=1}^{n} y_i \quad (5)$$

$$s_x^2 = \frac{1}{n}\sum_{i=1}^{n}(x_i - X)^2 \quad (6)$$

$$s_{xy} = \frac{1}{n}\sum_{i=1}^{n}(x_i - X)(y_i - Y) \quad (7)$$

Where, $s_x$ represents a variance value of the measurement load value, $s_{xy}$ represents a covariance value of the measurement load value and the reference load value, X represents an average value of the measurement load value, and Y represents an average value of the reference load value.

On the basis of Expressions (4) to (7), the control apparatus 9 calculates the calibration parameters as in Expression (8) below.

$$a = \frac{s_{xy}}{s_x^2}, \, b = Y - a \times X \quad (8)$$

Where, a represents the gain value and b represents the offset value.

Expression (8) is an example in which the least-squares method is applied while supposing that the relationship between the measurement load value $x_i$ and the reference load value $y_i$ is linear. The control apparatus 9 may apply the least-squares method while supposing that the relationship between the measurement load value $x_i$ and the reference load value $y_i$ is represented by a line of an expression of degree n. In this case, the relationship between the measurement load value $x_i$ and the reference load value $y_i$ can be generalized by Expression (9) below.

$$f(x) = \sum_{k=1}^{n} a_k g_k(x) \quad (9)$$

Where, $f(x)$ represents the reference load value, and $g_k(x)$ represents the measurement load value. When $g_k(x)=x^{k-1}$ is satisfied, $f(x)$ is expressed by Expression (10) below.

$$f(x) = a_1 + a_2 x + a_3 x^2 + \ldots + a_n x^{n-1} \quad (10)$$

Where, $a_1$ in Expression (10) represents the offset value, and $a_2$ to $a_n$ represent the gain values.

The servo controller 6 stores a gain value a and an offset value b in the storage unit 60 as calibration parameters as storage processing (Step S16). As confirmation operation processing (Step S18), the servo controller 6 simultaneously performs instrumentation of the measurement load value and the reference load value at the plurality of instrumentation points by the same method as in the instrumentation processing (Step S12). The servo controller 6 calibrates the measurement load value obtained in the confirmation operation processing (Step S18) with use of the calibration parameters stored in the storage processing (Step S16).

Next, as evaluation processing (Step S20), the control apparatus 9 calculates an error $(y_i-x_i)$ between the measurement load value $x_i$ after calibration and the reference load value $y_i$ obtained in the confirmation operation processing (Step S18) and determines that calibration has been accurately executed when the error is equal to or less than a threshold value. When the error is not equal to or less than the threshold value, it is determined that calibration has not been accurately executed. When the evaluation processing (Step S20) ends, the flowchart illustrated in FIG. 3 ends.

Figure 5:
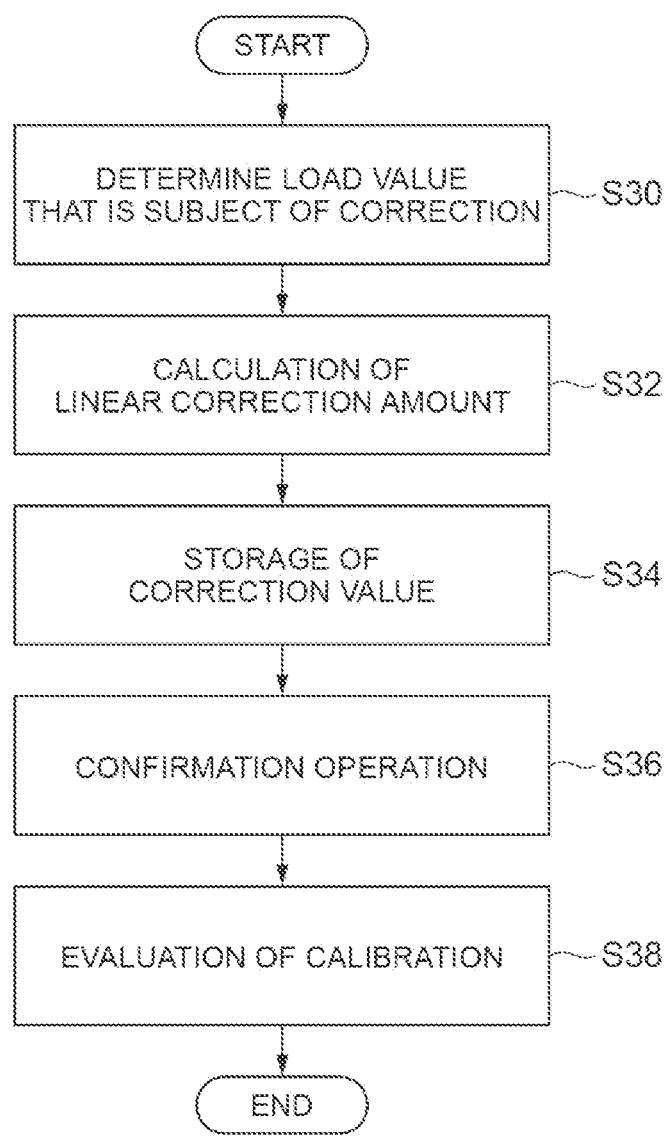
FIG. 5 is a flowchart illustrating one example of a correction operation.

Next, correction operation of the control apparatus 9 is described. FIG. 5 is a flowchart illustrating one example of the correction operation. The flowchart illustrated in FIG. 5 is executed when it is determined that calibration is not accurately executed in the evaluation processing (Step S20) in FIG. 3, for example.

As illustrated in FIG. 5, at first, the control apparatus 9 determines a load value that is the subject of correction, as subject determination processing (Step S30). The control apparatus 9 determines the measurement load value for which it is determined that calibration is not accurately executed in the evaluation processing (Step S20) in FIG. 3.

Next, the control apparatus 9 calculates, for the measurement load value determined in the subject determination processing (Step S30), a linear correction amount (Step S32). The control apparatus 9 calculates a reference load value corresponding to the measurement load value that is the subject of correction from measurement points that are two neighboring points by linear interpolation. When a measurement load value that is the subject of correction is not included in a range between two neighboring points, the control apparatus 9 calculates a reference load value by linear extrapolation. The control apparatus 9 calculates a reference load value $y_d$ corresponding to a measurement load value $x_d$ that is the subject of correction as in Expression (11).

$$y_d = (y_2 - y_1) \times \frac{(x_d - x_1)}{(x_2 - x_1)} + y_1 \quad (11)$$

Where, $x_1$ and $x_2$ represent measurement load values that are two neighboring points of the load value $x_d$, and $y_1$ and $y_2$ represent reference load values corresponding to the measurement load values $x_1$ and $x_2$. The control apparatus 9 causes a difference between the reference load value $y_d$ and the measurement load value $x_d$ to be a linear correction value $C_d$ as in Expression (12).

$$C_d = y_d - x_d = (y_2 - y_1) \times \frac{(x_d - x_1)}{(x_2 - x_1)} + y_1 - x_d$$

The servo controller 6 stores the linear correction value $C_d$ in the storage unit 60 as a calibration parameter, as storage processing (Step S34). As confirmation operation processing (Step S36), the servo controller 6 simultaneously performs instrumentation of the measurement load value and the reference load value at the plurality of instrumentation points by the same method as in the instrumentation processing (Step S12). The servo controller 6 calibrates the measurement load value obtained in the confirmation operation processing (Step S36) with use of the calibration parameters and corrects the measurement load value that is the subject of correction with use of the correction value $C_d$ stored in the storage processing (Step S34).

Next, as evaluation processing (Step S38), the control apparatus 9 calculates an error $(y_i - x_i)$ between the measurement load value $x_i$ after correction and the reference load value $y_i$ obtained in the confirmation operation processing (Step S36) and determines that calibration has been accurately executed when the error is equal to or less than a threshold value. When the error is not equal to or less than the threshold value, it is determined that calibration has not been accurately executed. When the evaluation processing (Step S38) ends, the flowchart illustrated in FIG. 5 ends.

SUMMARY OF EMBODIMENT

As above-stated, according to the electric cylinder system 100, the load value in accordance with the output value of the strain detector 2 is calibrated on the basis of the gain value a and the offset value b output by the output unit 90. The gain value a and the offset value b output by the output unit 90 satisfy the relationship expressed by Expression (1) above, and hence the calibration unit 61 can consider that the correspondence relationship between the reference load value and the measurement load value is a relationship approximated to a straight line by the least-squares method and calibrate the difference between the reference load value and the measurement load value. Therefore, according to the electric cylinder system 100, the correspondence relationship between the reference load value and the measurement load value can be derived by measuring the measurement load value corresponding to the reference load value several times, and hence the output of the strain detector 2 that detects the load of the electric cylinder 1 can be calibrated in an easier manner as compared to a case where fine adjustment of the gain value and the offset value of an amplifier of a load cell is performed while the result is confirmed.

The electric cylinder system 100 can determine whether the calibration has been adequately performed by the determination unit 91, and hence can reduce operation time as compared to a case where a worker performs the determination.

For a load value for which it is difficult to approximate the correspondence relationship between the reference load value and the measurement load value by the least-squares method, the electric cylinder system 100 can calculate the correction amount with use of the measurement load value and the reference load value of two neighboring points of the load value. Therefore, the electric cylinder system 100 can calibrate the output of the strain detector 2 that detects the load of the electric cylinder 1 in a more accurate manner.

MODIFICATION

Various exemplary embodiments have been described above, but various omission, replacement, and modifications may be made without being limited to the abovementioned exemplary embodiments. For example, the servo controller 6 and the control apparatus 9 described above may be logically or physically one unit. The calibration parameters stored in the storage unit 60 only need to satisfy the relationship of Expression (1) and may be derived by a method other than that described in the example. For example, the load values, the errors, the gain values, the offset values, and the correction values may be made into a database, and calculation may be performed by machine learning in which the above is training data. The calculation described in the embodiment is not limited to a case of being realized by executing a program by the control apparatus 9, and the calculation may be realized by a logic circuit or may be realized by a circuit in which the logic circuit is integrated, for example.

REFERENCE SIGNS LIST

100 . . . electric cylinder system, 1 . . . electric cylinder, 1a . . . rod, 2 . . . strain detector, 6 . . . servo controller, 7 . . . strain detector for calibration, 9 . . . control apparatus

The invention claimed is:
1. An electric cylinder system comprising:
an electric cylinder including a rod configured to press a workpiece, and a strain detector configured to output a value in accordance with a load applied to the rod;
a computer configured to output, on a basis of a reference load value in accordance with an output value of the strain detector for calibration obtained when the rod presses the strain detector for calibration and a measurement load value in accordance with an output value of the strain detector obtained when the rod presses the strain detector for calibration, a gain value and an offset value for causing the measurement load value to approach the reference load value;
a storage configured to store the gain value and the offset value output by the computer as a calibration parameter; and
a controller configured to calibrate a load value in accordance with an output value detected by the strain detector on a basis of the calibration parameter stored in the storage,
wherein the gain value and the offset value output by the computer satisfy a relationship of Expression (1):

$$a = \frac{s_{xy}}{s_x^2}, b = Y - a \times X \qquad (1)$$

where a represents the gain value, b represents the offset value, $s_x$ represents a variance value of the measurement load value, $s_{xy}$ represents a covariance value of the measurement load value and the reference load value, X represents an average value of the measurement load value, and Y represents an average value of the reference load value, the computer further determines whether a difference between the reference load value and the measurement load value after calibration is equal to or less than a threshold value, the computer outputs, when it is determined that the difference is not equal to or less than the threshold value, a correction value for correcting the load value corresponding to the measurement load value for which it is determined that the difference is not equal to or less than the threshold value, the storage stores the correction value output by the computer, the controller corrects the load value in accordance with the output value detected by the strain detector on a basis of the correction value stored in the storage, and the correction value output by the computer satisfies a relationship of Expression (2):

$$C_d = y_d - x_d = (y_2 - y_1) \times \frac{(x_d - x_1)}{(x_2 - x_1)} + y_1 - x_d \qquad (2)$$

where $C_d$ represents the correction value, $x_d$ represents the load value that is a subject of correction, $y_d$ is the reference load value corresponding to the load value $x_d$, $x_1$ and $x_2$ are measurement load values of two neighboring points of the load value $x_d$, and $y_1$ and $y_2$ are reference load values corresponding to the measurement load values $x_1$ and $x_2$.

\* \* \* \* \*